(12) United States Patent
Arai et al.

(10) Patent No.: US 10,389,939 B2
(45) Date of Patent: Aug. 20, 2019

(54) IMAGING CONTROL APPARATUS (71) Applicant: CANON KABUSHIKI KAISHA, Tokyo (JP)

(72) Inventors: Kenichi Arai, Asaka (JP); Naoki Shimma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/949,495

(22) Filed: Apr. 10, 2018

(65) Prior Publication Data

US 2018/0302560 A1   Oct. 18, 2018

(30) Foreign Application Priority Data

Apr. 17, 2017   (JP) ................... 2017-081640

(51) Int. Cl.
  *H04N 5/232*   (2006.01)
(52) U.S. Cl.
  CPC ..... *H04N 5/23241* (2013.01); *H04N 5/23245* (2013.01); *H04N 5/23293* (2013.01); *H04N 5/232411* (2018.08)
(58) Field of Classification Search
  CPC ................................................. H04N 5/23241
  USPC ........................................................ 348/372
  See application file for complete search history.

(56) References Cited

U.S. PATENT DOCUMENTS

| | | | | |
|---|---|---|---|---|
| 6,002,436 A | * | 12/1999 | Anderson | H04N 5/232 348/372 |
| 2015/0043893 A1 | * | 2/2015 | Nishizaka | G11B 27/005 386/278 |
| 2015/0215533 A1 | * | 7/2015 | Ishihara | H04N 5/23241 348/372 |

FOREIGN PATENT DOCUMENTS

| JP | 2006-332746 A | 12/2006 |
|---|---|---|
| JP | 2015-41908 A | 3/2015 |

\* cited by examiner

*Primary Examiner* — Anthony J Daniels
(74) *Attorney, Agent, or Firm* — Canon U.S.A., Inc. IP Division

(57) ABSTRACT

An imaging control apparatus includes a first operation unit and a sub control unit configured to perform control such that, in a case of performing a series of image capturing operations for performing a plurality of image capturing operations including a first image capturing operation and a second image capturing operation to be performed after the first image capturing operation, in a third period between a first period for performing the first image capturing operation and a second period for performing the second image capturing operation, a display is not performed on a display unit and a notification is not provided to a user by a notification unit different from the display unit, and in response to an operation performed by the first operation unit in the third period, the notification is performed by the notification unit different from the display unit without performing the display on the display unit.

12 Claims, 8 Drawing Sheets

IMAGING CONTROL APPARATUS

BACKGROUND OF THE INVENTION

Field of the Invention

The present invention relates to an imaging control apparatus, and more particularly, to a technique for providing a user with a timely notification during a period between image capturing operations in a series of image capturing operations for performing a plurality of image capturing operations.

Description of the Related Art

A method for performing an operation in an energy saving manner during interval image capturing is discussed. Japanese Patent Application Laid-Open No. 2006-332746 discusses a technique in which, when image capturing is finished, power supply to a main central processing unit (CPU) is stopped to put the main CPU into a sleep state, and when an image capturing time is reached, the main CPU is started to perform image capturing. There is also a method for providing a user with a notification when a display is turned off and the CPU enters into a sleep state. Japanese Patent Application Laid-Open No. 2015-41908 discusses a technique for providing a user with a notification by causing a light-emitting diode (LED) to blink when a display is turned off and the CPU enters into a sleep state during time lapse image capturing.

In a case where the main CPU is put into the sleep state during a period between image capturing operations as discussed in Japanese Patent Application Laid-Open No. 2006-332746, if the display is turned off and the LED is caused to blink to provide a user with a notification as discussed in Japanese Patent Application Laid-Open No. 2015-41908, for example, when the interval between image capturing operations is long, such as one hour or five hours, power consumption increases. On the other hand, if no notification is provided to the user, the user cannot recognize the sleep state. Accordingly, there is a possibility that the user cannot recognize whether interval image capturing is being carried out.

SUMMARY OF THE INVENTION

In view of the above-described issues, the present invention is directed to providing an imaging control apparatus that enables a user to timely recognize that a series of image capturing operations for performing a plurality of image capturing operations as described above is being carried out, while reducing power consumption in the series of image capturing operations.

According to an aspect of the present invention, an imaging control apparatus includes a first operation unit and a sub control unit configured to perform control in such a manner that, in a case of performing a series of image capturing operations for performing a plurality of image capturing operations including a first image capturing operation and a second image capturing operation to be performed after the first image capturing operation, in a third period between a first period for performing the first image capturing operation and a second period for performing the second image capturing operation, a display is not performed on a display unit and a notification is not provided to a user by a notification unit different from the display unit, and in response to an operation performed by the first operation unit in the third period, the notification is performed by the notification unit different from the display unit without performing the display on the display unit.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

Figure 1A:
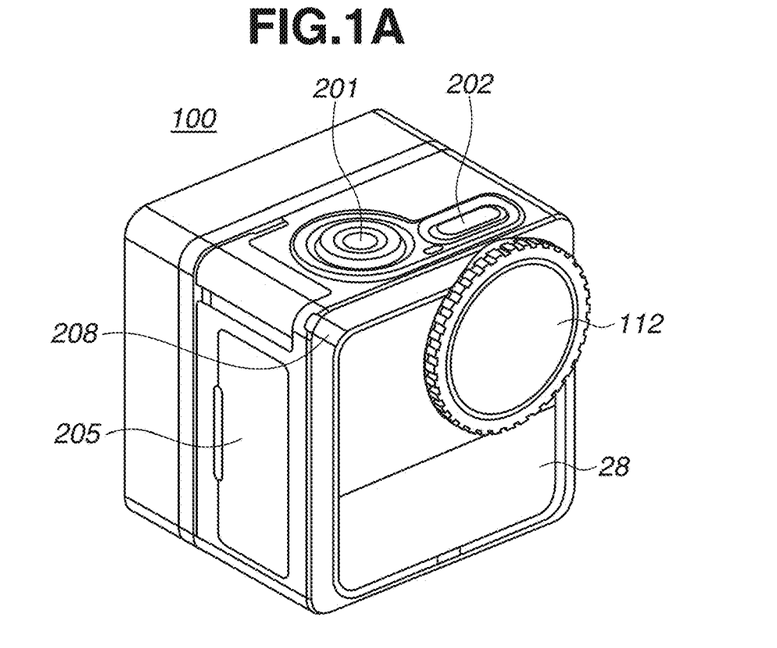
FIGS. 1A and 1B are external views each illustrating a digital camera as an example of an apparatus to which a configuration according to an exemplary embodiment of the present invention can be applied.
Figure 1B:
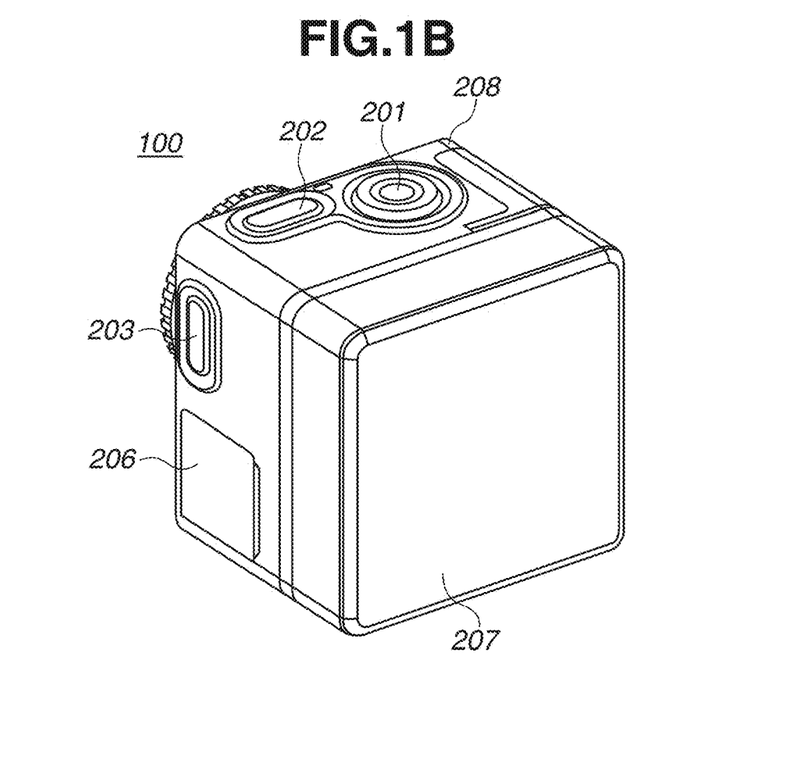
Figure 2A:
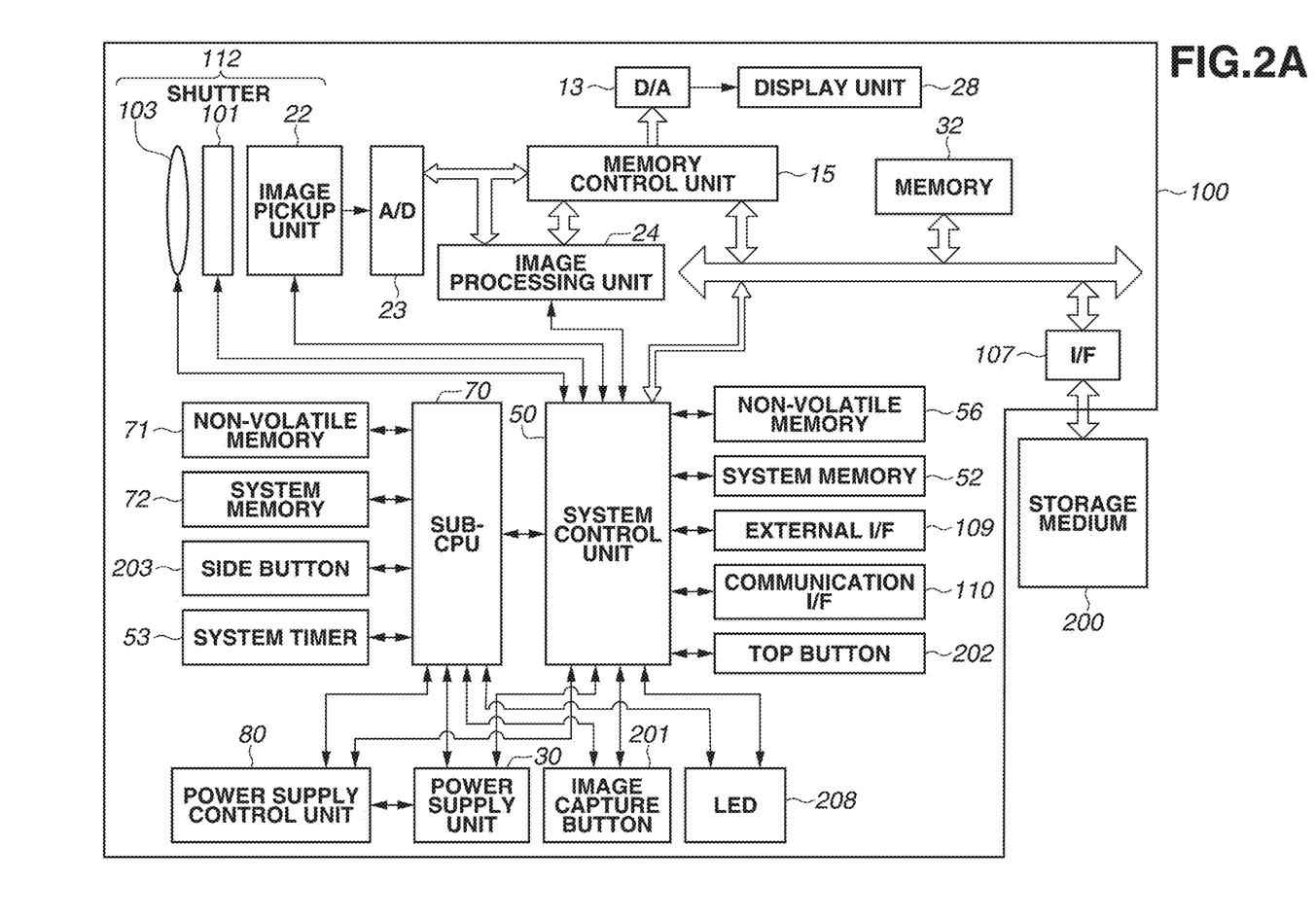
FIGS. 2A, 2B, and 2C are block diagrams each illustrating a configuration example of the digital camera as an example of the apparatus to which the configuration according to the present exemplary embodiment can be applied.
Figure 2B:
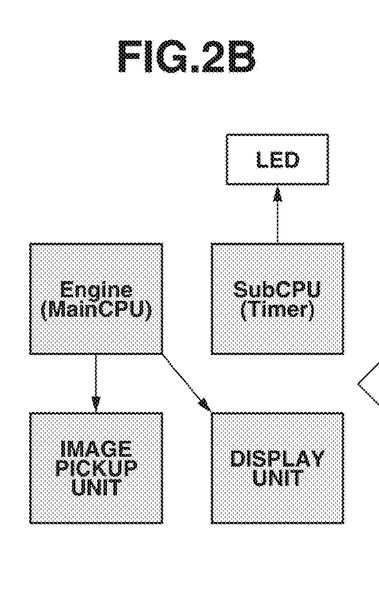
Figure 2C:
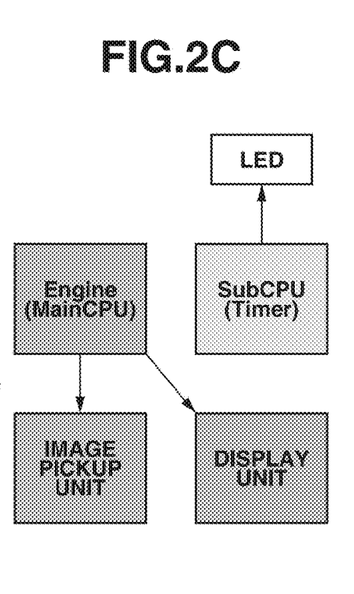

A first exemplary embodiment will now be described. FIGS. 1A and 1B are external views each illustrating a digital camera 100 as an example of an imaging control apparatus according to the present invention. FIGS. 2A to 2C are block diagrams each illustrating a configuration example of the digital camera 100 as an example of the imaging control apparatus according to the present invention.

FIG. 1A is a front perspective view of the digital camera 100, and FIG. 1B is a rear perspective view of the digital camera 100. The digital camera 100 according to the present exemplary embodiment has a small substantially cubic shape or rectangular parallelepiped shape with a side of approximately 1 to 3 cm (the length, breadth, and height of the shape are about 10 cm in total). The size of the digital camera 100 is not limited to this size. However, since the digital camera 100 has a small shape, only a limited number of buttons having a practical size for a user to operate can be arranged, and the location where the buttons can be arranged is also limited. An optical incidence plane (lens front surface) for object light of a lens of a camera unit 112 is disposed on a right side (right side as viewed from the front side of the digital camera 100) relative to the center of an upper portion on the front surface of the digital camera 100. A display unit 28 is disposed at a lower portion on the front surface of the digital camera 100. An image pickup direction of the camera unit 112 is the same as a display direction of the display unit 28.

An image capture button (REC button) 201 and a top button 202 are disposed on an upper surface of the digital camera 100. The image capture button 201 and the top button 202 are push buttons. It is also assumed that the digital camera 100 is used in a state where the upper surface of the digital camera 100 cannot be visually observed by the user, for example, when the digital camera 100 is mounted on a helmet. In such a case, the image capture button 201 is formed to have a size larger than that of the top button 202 and have a shape different from that of the top button 202 so that the user can discriminate the buttons when the user attempts to recognize the image capture button 201 and the top button 202 by touch. Specifically, the image capture button 201 has a circular shape and the top button 202 has an elliptic shape or rectangular shape. A side button 203 is disposed on the right side as viewed from the front side of the digital camera 100 (at the left side as viewed from the back side of the digital camera 100. This side is hereinafter referred to as the right side). The side button 203 is a push button. The side button 203 is used for an operation executed in combination with the top button 202 in many cases as described below. Accordingly, the top button 202 and the side button 203 are formed to have substantially the same size and substantially the same shape so that a user will know that the top button 202 and the side button 203 are to be used in combination. Although the top button 202 and the side button 203 are disposed on different surfaces, the top button 202 and the side button 203 are disposed adjacent to each other and no other operation members are provided between the top button 202 and the side button 203. The top button 202 is disposed on the right side relative to the center of the upper surface. The side button 203 is disposed on the upper side relative to the center of the right side. The image capture button 201 is disposed on the left side relative to the center of the upper surface (closer to the surface opposite to the right side). When the image capture button 201 is pressed in an image capturing standby state, a system control unit 50 performs still image capturing in a still image capturing mode, and starts moving image capturing (recording) in a moving image capturing mode. In interval image capturing, interval image capturing for performing a plurality of image capturing operations is started at time intervals or times, which are set by the user, by pressing the image capture button 201 (in one image capturing instruction operation) in the image capturing standby state. In still image capturing, a series of processing operations as described below is carried out. That is, the camera unit 112 performs autofocus, an image pickup unit 22 (image sensor) performs exposure (image pickup) for still image capturing, and an image processing unit 24 processes the generated image data to generate a still image file to be recorded on a recording medium 200. In moving image capturing, a series of processing operations as described below is carried out. That is, the camera unit 112 performs autofocus, the image sensor performs exposure (image pickup) for moving image capturing, and the image processing unit 24 processes the generated image data to generate a moving image file to be recorded on the recording medium 200. In interval image capturing, the user can set any time intervals, or six times a day. The digital camera 100, which has a small size and a light weight as described above, can be set in an unstable place, such as a narrow place or a high place. For example, in a case where the digital camera 100 is installed for a long period, such as half a year, on a farm or countryside to observe the growth process of plants, the digital camera 100 can remain installed without the need for the user to replace batteries during the period. Accordingly, in interval image capturing according to the present exemplary embodiment, power consumption is suppressed so that the batteries will last for at least half a year, for example, when image capturing is performed about four times a day. Since the power consumption is reduced, the batteries can last for half a year or longer, which eliminates the need for the user to replace batteries frequently, such as once in several days, or to frequently check a remaining battery level, even when the user performs image capturing three times a day, e.g., morning, noon, and night. In addition, there is no need for the user to walk around to replace batteries for a plurality of cameras installed on a wide farm. Accordingly, in the digital camera 100, the power consumption is reduced by performing control processing using a main central processing unit (CPU) (main control unit, system control unit 50) and a sub-CPU (sub-control unit). In interval image capturing, the main CPU (system control unit 50 described below) is put into a sleep state to suppress power consumption in an interval image capturing standby state until a lapse of a time interval set by the user, or until a next time, and the sub-CPU performs control processing. In the sleep state, the operation, such as display and control, is stopped (temporarily stopped). The selective use of the main CPU and the sub-CPU will be described in detail below.

Screw holes for fixing an installation instrument, such as a tripod, are formed in a bottom surface of the digital camera 100. A connection terminal cover 205 is disposed on the left side as viewed from the front side of the digital camera 100 (right side as viewed from the back side of the digital camera 100. This side is hereinafter referred to as the left side). When the connection terminal cover 205 is opened, a wired connection terminal (e.g., HDMI® connection terminal) which is provided as an external I/F 109 and a wired connection terminal (e.g., universal serial bus (USB) connection terminal) which is provided as a communication I/F 110 appear. The communication I/F 110 may be a wireless line. A lid 206 for a memory card slot, the memory card serving as a recording medium I/F 107, is disposed below the side button 203 located on the right side of the digital camera 100. When the lid 206 is opened, the memory card slot appears. Connection terminals (including a power supply terminal and a video input/output terminal) capable of connecting an additional power supply unit, a recorder unit, a communication unit, and the like are provided on the back surface of the digital camera 100 and appear when a cover unit 207 is detached.

The cover unit 207 may be omitted. A light-emitting diode (LED) 208 is disposed at a vertex where the upper surface, the front surface, and the left side of the digital camera 100 intersect with each other. The LED 208 performs operation notification processing for notifying the user of various states of the digital camera 100 by using light emission patterns. The LED 208 can be visually observed along three directions, i.e., the upper side, the front side, and the left side (left side as viewed from the front side) of the digital camera 100. In other words, light emitted from the LED 208 can also be recognized in directions other than the display direction of the display unit 28. The LED 208 is disposed at a location slightly lower (back side) than the optical incidence plane of the camera unit 112 so that the light emitted from the LED 208 does not enter a captured video. While the LED 208 is used in the present exemplary embodiment, light emitting elements other than the LED may also be used.

FIGS. 2A to 2C are block diagrams each illustrating a configuration example of the digital camera 100 according to the present exemplary embodiment. Components that can be controlled in the system control unit 50 will now be described. The system control unit 50 detects (can detect) whether a button is pressed at 10 ms. Referring to FIGS. 2A to 2C, an image pickup lens 103 is a lens group including a zoom lens and a focus lens. A shutter 101 is a shutter including an aperture function. The image pickup unit 22 is an image sensor including a charge-coupled device (CCD) sensor or a complementary metal-oxide semiconductor (CMOS) sensor for converting an optical image into an electrical signal. An A/D converter is used to convert an analog signal output from the image pickup unit 22 into a digital signal.

The image processing unit 24 performs predetermined pixel interpolation processing, resize processing, such as reduction, and color conversion processing on data from the A/D converter 23, or data from a memory control unit 15. The image processing unit 24 performs predetermined calculation processing using the captured image data, and the system control unit 50 performs exposure control and ranging control based on the obtained calculation processing result. Thus, autofocus (AF) processing and automatic exposure (AE) processing of a Through The Lens (TTL) system are carried out. The image processing unit 24 further performs predetermined calculation processing using the captured image data, and performs automatic white balance (AWB) processing of the TTL system based on the obtained calculation processing result.

The output data from the A/D converter 23 is directly written into a memory 32 through the image processing unit 24 and the memory control unit 15, or is directly written into the memory 32 through the memory control unit 15 without passing through the image processing unit 24. The memory 32 stores the image data that is obtained by the image pickup unit 22 and converted into digital data by the A/D converter 23. The memory 32 has a sufficient storage capacity for storing a predetermined number of still images and storing a moving image and sound data of a predetermined period of time.

The display unit 28 displays a graphical user interface (GUI) screen constituting a GUI, and the like based on the control of the system control unit 50. The system control unit 50 generates a display control signal according to a program and controls each unit of the digital camera 100 to generate a video signal to be displayed on the display unit 28, and output the video signal to the display unit 28. The display unit 28 displays a video based on the output video signal. In the display unit 28, organic electroluminescence (EL) or the like may be used for light emitting elements in respective pixels, to thereby reduce power consumption according to the amount of information to be displayed.

A non-volatile memory 56 is a memory serving as a recording medium that is electrically erasable, recordable, and readable by the system control unit 50. For example, an electrically erasable programmable read-only memory (EEPROM) is used as the non-volatile memory 56. The non-volatile memory 56 stores constants, programs, and the like used for operation of the system control unit 50. The programs described herein refer to computer programs for executing various flowcharts in the present exemplary embodiment.

The recording medium I/F 107 is an interface with the recording medium 200 such as a memory card or a hard disk. The recording medium 200 is a non-volatile recording medium, such as a memory card, for recording images during image capturing. The recording medium 200 includes a semiconductor memory, an optical disk, or a magnetic disk. The digital camera 100 also includes the external I/F 109 that is connectable to an external device, and the communication I/F 110 that is communicable with an external device.

The system control unit 50 incorporates at least one processor and controls the components of the digital camera 100. The programs recorded on the non-volatile memory 56 described above are executed to implement each processing according to the present exemplary embodiment. A random access memory (RAM) is used as the system memory 52. Constants and variables used for operation of the system control unit 50, and programs and the like read from the non-volatile memory 56 are loaded into the system memory 52. The system control unit 50 also performs display control by controlling the memory 32, a D/A converter 13, the display unit 28, and the like.

The system control unit 50 starts, in response to pressing of the image capture button 201, a series of image capture processing operations including the still image capturing operation performed by the image pickup unit 22, reading a signal from the image pickup unit 22, and writing image data into the recording medium 200. In an interval image capturing mode, image capturing is performed at time intervals or times set by the user. The system control unit 50 can also detect pressing of the top button 202.

The system control unit 50 can control the light emission of the LED 208 and can also acquire information about a remaining battery level from a power supply control unit 80. The power supply control unit 80 includes a battery detection circuit, a direct current to direct current (DC-DC) converter, and a switch circuit for switching blocks to be energized, and detects whether batteries are mounted, the types of batteries, and the remaining battery level of each battery. The power supply control unit 80 controls the DC-DC converter based on the detection result and an instruction from the system control unit 50, and supplies a necessary voltage to each unit including the recording medium 200 for a necessary period.

A power supply unit 30 includes a primary battery such as an alkaline battery or a lithium battery, a secondary battery such as a NiCd battery, a NiMH battery, or a Li battery, or an alternating current (AC) adapter. The power supply unit 30 supplies power to each of the system control unit 50 and the sub-CPU 70.

Next, the components that can be controlled in the sub-CPU 70 will be described. The sub-CPU 70 detects pressing of a button at 20 ms. The sub-CPU 70 incorporates at least one processor and controls the components of the digital camera 100. Programs recorded on a non-volatile memory 71 are executed to implement each processing according to the present exemplary embodiment. A RAM is used as a system memory 72. Constants and variables used for operation of the sub-CPU 70, and programs and the like read from the non-volatile memory 71 are loaded into the system memory 72. A system timer 53 is a time measurement unit that measures the time used for various control operations or the time of a built-in clock. In the interval image capturing mode, the system timer 53 can measure the time until the next image capturing operation. The side button 203 is a button (power supply operation unit) for switching ON and OFF of the digital camera 100.

The LED 208 can be controlled by both the sub-CPU and the main CPU (system control unit 50). However, when the system control unit 50 is put into the sleep state in the interval image capturing standby state, the sub-CPU 70 controls the LED 208. In the interval image capturing standby state, the sub-CPU 70 also detects pressing of the image capture button 201. In a state other than the interval image capturing standby state, the system control unit 50 detects pressing of the image capture button 201. Regardless of the interval image capturing standby state, the sub-CPU 70 detects pressing of the side button 203, and when the power supply is switched from an OFF state to an ON state, the system control unit 50 is started.

FIGS. 2B and 2C are block diagrams each illustrating the internal configuration of the digital camera 100 that is activated during image capturing in interval image capturing mode and in a standby state for the interval image capturing mode according to the present exemplary embodiment. FIG. 2B illustrates a case where the system control unit 50 and the sub-CPU 70 are in the started state to perform image capturing in the interval image capturing mode. FIG. 2B illustrates a state where the image pickup unit 22 and the display unit 28 are controlled by the main CPU (system control unit 50) to perform image capturing and display processing. FIG. 2C illustrates the standby state during a period between image capturing operations in the interval image capturing mode. Since the main CPU is in the sleep state, image capturing and display processing are not carried out. However, the sub-CPU 70 is started to control the system timer 53 and the light emission of the LED. In the standby state during interval image capturing, the sub-CPU 70 measures the time until the next image capturing operation, and starts the main CPU to perform interval image capturing.

The present exemplary embodiment is described assuming that, in a normal case, the top button 202 is used as a menu button, the side button 203 is used as a power supply button (used as a power supply button when pressed for a long time, and used as an image capturing mode switching button when pressed for a short time), the top button 202 on the menu screen is used as an up-arrow key, and the side button 203 is used as a down-arrow key. However, the functions to be allocated to the respective buttons are not limited to these functions, and the positions of the respective buttons are also not limited to the positions described above.

Figure 3:
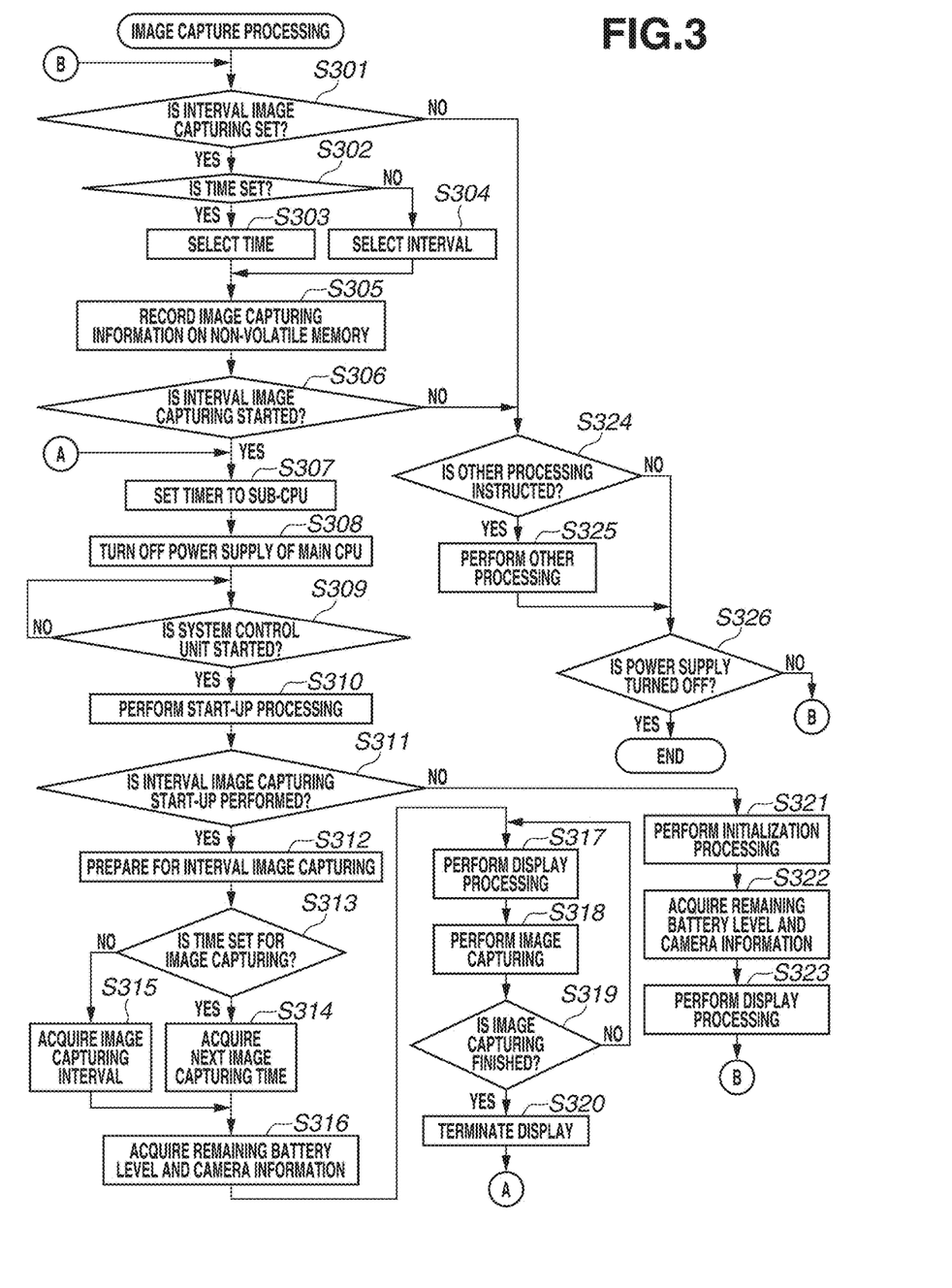
FIG. 3 is a flowchart illustrating image capture processing executed by a system control unit according to a first exemplary embodiment.

Image capture processing executed by the system control unit 50 according to the present exemplary embodiment will be described with reference to FIG. 3. This processing is implemented in such a manner that a program recorded on the non-volatile memory 56 is loaded into the system memory 52 and the program is executed by the system control unit 50. This processing is started when the power supply of the digital camera 100 is turned on to be ready for image capturing.

Figure 5A:
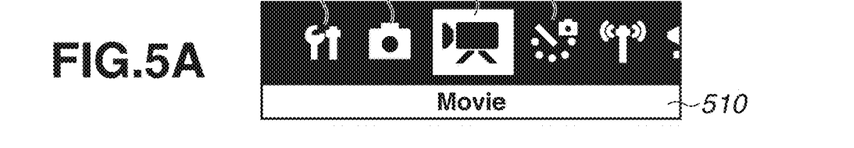
FIGS. 5A, 5B, 5C, 5D, and 5E each illustrate a state of a digital camera according to the first exemplary embodiment.

In step S301, the system control unit 50 determines whether interval image capturing is set. Interval image capturing is set when the top button 202 is pressed and the interval image capturing mode is selected from among a plurality of image capturing modes, including the still image capturing mode and the moving image capturing mode, as the image capturing mode, on the menu screen. FIG. 5A illustrates a menu screen 510. An item 511 indicates a setting. An item 512 indicates the still image capturing mode. An item 513 indicates the moving image capturing mode. An item 514 indicates the interval image capturing mode. On the menu screen 510, the side button 203 functions as a right-arrow key and the top button 202 functions as a left-arrow key, thereby enabling switching of items to be selected. Further, the image capture button 201 can enter the selected item. Thus, the selection of items enables selection of the setting or the image capturing mode. If it is determined that interval image capturing is set (YES in step S301), the processing proceeds to step S302. If it is determined that interval image capturing is not set (NO in step S301), the processing proceeds to step S324. Switching of the image capturing mode may be performed in such a manner that the still image capturing mode, the moving image capturing mode, and the interval image capturing mode are sequentially switched by pressing the side button 203 for a short time (pressing within a predetermined period).

Figure 5B:
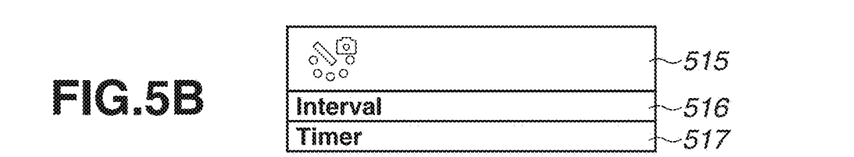

In step S302, the system control unit 50 determines whether the time is set. In interval image capturing, there are two types of settings, i.e., a time setting for performing image capturing at times set by the user, and a time interval setting for performing image capturing at time intervals set by the user, and one of these settings is selected (as an image capture timing). If it is determined that the time setting is selected (YES in step S302), the processing proceeds to step S303. If it is determined that the time setting is not selected (time interval setting) (NO in step S302), the processing proceeds to step S304. FIG. 5B illustrates a setting screen 515 for interval image capturing. One of an item 516 indicating the time setting and an item 517 indicating the time interval setting can be selected. On the menu screen 510, the side button 203 functions as a down-arrow key and the top button 202 functions as an up-arrow key, thereby enabling switching of items to be selected. The image capture button 201 can enter the selected item.

In step S303, the system control unit 50 performs the time setting. The system control unit 50 can set six times at maximum.

In step S304, the system control unit 50 performs the time interval setting. In the time interval setting, the time intervals can be finely set in terms of, for example, hours and minutes. If the system control unit 50 is started and communicable with an external device via the communication I/F 110, the setting about interval image capturing described in steps S301 to S304 can also be made by a remote operation by an external device such as a smartphone or a remote controller.

In step S305, the system control unit 50 records the set time intervals or the set times on the non-volatile memory 56 (or the system memory 52).

In step S306, the system control unit 50 determines whether interval image capturing is started, i.e., whether the image capture button 201 is pressed. If it is determined that interval image capturing is started (YES in step S306), the processing proceeds to step S307. If it is determined that interval image capturing is not started (NO in step S306), the processing proceeds to step S324.

In step S307, the system control unit 50 sets a timer to the sub-CPU 70. At this time, the sub-CPU 70 is caused to store information indicating that the interval image capturing mode is set. In the case of time setting, a time interval from the current time to the time immediately before the next image capturing operation is calculated, and the calculated time interval is set to the sub-CPU 70 and the sub-CPU 70 starts the system control unit 50 for interval image capturing immediately before the next image capturing operation. In the case of time interval setting, in a first image capturing operation, the processing of step S307 is carried out after the processing of steps S315 to S320 is carried out, i.e., after the first image capturing operation and display processing are carried out. In the case of time setting, if the current time has already reached the time set by the user, the processing proceeds to step S314 to perform image capturing and then the processing of step S307 is carried out. At this time, if the current time is earlier than the time set by the user by a predetermined period (a time required for start-up from the sleep state), such as three seconds or two seconds, the system control unit 50 remains in the start-up state and performs the first image capturing operation, without shifting to the sleep state. However, in view of the power consumption required for processing in the sleep state and the start-up of the system control unit 50, time measurement of the sub-CPU 70, and start-up processing of the system control unit 50, if the power consumption when the system control unit 50 remains in the start-up state is smaller than that when the system control unit 50 is put into the sleep state, the system control unit 50 remains in the start-up state even if this duration exceeds three seconds. For example, 10 seconds or less are left until the next time, the processing may proceed to step S314. To accurately perform image capturing at the image capturing time, the timer is set to start the system control unit 50 slightly before the image capturing time in consideration of a time required for starting the system control unit 50, or a time required for preparing for image capturing.

In step S308, the system control unit 50 turns off the power supply of the system control unit 50 (power supply to some circuits is actually maintained), or puts the system control unit 50 into the sleep state. When the system control unit 50 is put into the sleep state, driving of the camera unit 112, display of the display unit 28, communication with an external device, and the like, which are controlled by the system control unit 50, cannot be performed. In addition, the control unit that detects an operation on the image capture button 201 and the control unit that controls the light emission of the LED 208 are switched from the system control unit 50 to the sub-CPU 70. The system control unit 50 detects pressing of a button at 10 ms, while the sub-CPU 70 detects pressing of a button at 20 ms for power saving.

In step S309, if the system control unit 50 is started by the sub-CPU 70 based on timer information (YES in step S309), the processing proceeds to step S310. If the system control unit 50 is not started (NO in step S309), the system control unit 50 stands by until the system control unit 50 is started.

In step S310, the system control unit 50 performs start-up processing. In the start-up processing, a voltage is applied to each of the non-volatile memory 56 and the system memory 52 to bring the non-volatile memory 56 and the system memory 52 into a writable or readable state, or to enable the display unit 28 to perform display. Further, the image pickup unit 22, the shutter 101, and the like of the camera unit 112 are started to be ready for image capturing. In step S310, start-up sound may be output for one second from a speaker (not illustrated) to notify the user of the start-up.

In step S311, the system control unit 50 determines whether the start-up in step S309 is interval image capturing start-up performed by the sub-CPU 70. If the interval image capturing start-up is performed (YES in step S311), the processing proceeds to step S312. If the internal image capturing start-up is not performed (NO in step S311), the processing proceeds to step S321. Factors for starting the system control unit 50 from the sleep state include start-up for interval image capturing and normal start-up. The term "normal start-up" refers to start-up by pressing the side button 203 from a state where the power supply of the digital camera 100 is turned off, and initialization processing is performed simultaneously with the start-up. On the other hand, in start-up for interval image capturing, the system control unit 50 is started immediately before image capturing by the sub-CPU in the interval image capturing standby state, to thereby perform image capturing, and the interval image capturing operation is continued from the previous image capturing operation without performing initialization processing. After image capturing is finished, the system control unit 50 is automatically put into the sleep state.

In step S312, the system control unit 50 prepares for interval image capturing. In the preparation for interval image capturing, white balance for image capturing, reading of set values in a setting for exposure, focus adjustment processing, and the like are performed.

In step S313, the system control unit 50 determines whether the current setting for interval image capturing is the time setting based on the information recorded on the non-volatile memory 56 (or the system memory 52). If it is determined that the current setting is the time setting (YES in step S313), the processing proceeds to step S314. If it is determined that the current setting is not the time setting (i.e., it is time interval setting) (NO in step S313), the processing proceeds to step S315.

In step S314, the system control unit 50 acquires (time acquisition) the time subsequent to the current time from an image capturing time list in the non-volatile memory 56. For example, when 1:00, 5:00, 9:00, 13:00, and 17:00 are set as the image capturing times and the current time is 1:00, 5:00 is acquired from the list.

In step S315, the system control unit 50 acquires (time acquisition) the image capturing interval from the non-volatile memory 56 (or the system memory 52).

In step S316, the system control unit 50 acquires the remaining battery level from the power supply control unit 80 and acquires information (an exposure correction value, a recording size, an aspect ratio, etc.) to be displayed on the display unit 28 from the non-volatile memory 56. Further, the number of images that can be captured is calculated from the remaining battery level acquired from the power supply control unit 80.

In step S317, the system control unit 50 performs display processing for displaying the next image capturing time or image capturing interval and the information acquired in steps S314 to S316 (the display unit 28 is turned on for a predetermined period before step S320).

In step S318, the system control unit 50 performs image capturing. Images captured by the image pickup unit are recorded on the recording medium 200 as images captured in interval image capturing. In addition, shutter sound is output to notify the user that image capturing is being carried out.

In step S319, the system control unit 50 determines whether image capturing is finished. If it is determined that image capturing is finished (YES in step S319), the processing proceeds to step S320. If it is determined that image capturing is not finished (NO in step S319), the processing proceeds to step S317 to continue the display processing and image capturing.

In step S320, the system control unit 50 terminates the display of the display unit 28 (turns off the display unit 28), and the processing returns to step S307 to put the system control unit 50 into the sleep state. Alternatively, the display of the display unit 28 may be terminated after a lapse of a predetermined period (e.g., a given period such as 10 seconds) from the end of image capturing. Further, ending sound is output to indicate that the start-up processing is terminated to return to the sleep state. A mode for muting the sound (or stopping the light emission) may be selected. This is because the output of sound or light emission is not desirable depending on usage conditions.

In step S321, the system control unit 50 performs initialization processing. Step S321 is processing executed when it is determined in step S311 that the start-up is not the interval image capturing start-up, but is the normal start-up. In the initialization processing, not only the processing in the start-up processing of step S310, but also processing for initializing the current image capturing state is carried out. Accordingly, a record that interval image capturing is being carried out is deleted and interval image capturing is stopped. Therefore, after the initialization processing of step S321, if interval image capturing is not started again, image capturing is not carried out after a lapse of the image capturing time or the time interval set from the previous interval image capturing operation.

In step S322, the system control unit 50 performs processing similar to the processing of step S316.

In step S323, the system control unit 50 performs processing for displaying the information acquired in step S322 on the display unit 28. However, information about interval image capturing is not displayed.

In step S324, the system control unit 50 determines whether other processing is instructed. Examples of other processing instructed include image capturing of a still image or a moving image, and setting of the digital camera 100. If it is determined that other processing is instructed (YES in step S324), the processing proceeds to step S325. If it is determined that other processing is not instructed (NO in step S324), the processing proceeds to step S326.

In step S325, the system control unit 50 performs the processing instructed in step S324.

In step S326, the system control unit 50 determines whether an instruction for turning off the power supply is made by the sub-CPU 70. If the sub-CPU 70 detects pressing of the power supply button 203 and determines, as a result of detection, that the instruction for turning off the power supply is made (YES in step S326), the processing of FIG. 3 is terminated. If the instruction for turning off the power supply is not made (NO in step S326), the processing returns to step S301.

According to the exemplary embodiment described above, it is possible to enable the user to recognize when the next interval image capturing operation is performed, or recognize that interval image capturing is performed according to the setting, while reducing the power consumption in the digital camera 100. In the case of time setting, image capturing operations are not necessarily performed at regular intervals, and subsequent image capturing operations are not necessarily performed at the same image capturing interval as that for the previous operations, and thus the user needs to check the image capturing time every time image capturing is performed. If a display area is increased to display all the set image capturing times, the power consumption is increased by a corresponding amount, so that the number of images that can be captured is reduced (long-time interval image capturing cannot be performed). Accordingly, upon start-up for image capturing, the next image capturing time is displayed to thereby enable the user to recognize that interval image capturing is being carried out according to the setting. A display is not performed during the period in the interval image capturing standby state and a display is performed when the system control unit 50 is started for image capturing, which leads to a reduction in the number of times of start-up and start-up period of the system control unit 50. When interval image capturing is continuously performed, the number of images that can be captured is prevented from being reduced by reducing the number of times of start-up and start-up period of the system control unit 50.

Next, image capture processing executed by the sub-CPU 70 according to the present exemplary embodiment will be described with reference to FIG. 4. This processing is implemented in such a manner that a program recorded on the non-volatile memory 71 is loaded into the system memory 72 and the program is executed by the sub-CPU 70. This processing is started when power supply to the sub-CPU 70 from the power supply unit 30 through the power supply control unit 80 is started and the sub-CPU 70 is ready to perform control processing.

In step S401, the sub-CPU 70 determines whether a timer for interval image capturing is set by the system control unit 50. If it is determined that the timer is set (YES in step S401), the processing proceeds to step S402. If it is determined that the timer is not set (NO in step S401), the processing proceeds to step S414.

In step S402, the sub-CPU 70 records, on the system memory 72, information indicating that the current image capturing mode is the interval image capturing mode and the image capturing period is currently set. When the sub-CPU 70 measures the time of the timer in the interval image capturing mode, the sub-CPU 70 starts the system control unit 50 after a lapse of the set time. Further, the system control unit 50 performs interval image capturing after start-up.

In step S403, the sub-CPU 70 starts the measurement of the time set in step S401. The system control unit 50 sets the length of time until the next image capturing as the timer in the time setting, as well as in the time interval setting. Thus, the sub-CPU 70 starts the system control unit 50 according to a lapse of the set time, regardless of whether the time setting or the time interval setting is selected. The time measurement is performed by the system timer 53.

In step S404, the sub-CPU 70 determines whether the image capture button 201 is pressed in the interval image capturing standby state. If it is determined that the image capture button 201 is pressed (YES in step S404), the processing proceeds to step S405. If it is determined that the image capture button 201 is not pressed (NO in step S404), the processing proceeds to step S408.

In step S405, the sub-CPU 70 causes the LED 208 to emit light. At this time, the system control unit 50 is not started and thus a display is not performed on the display unit 28. However, a guidance or sound may be output to indicate that the interval image capturing operation is in the standby state. If the system control unit 50 is started, the power consumption is increased by a corresponding amount, which leads to a reduction in the number of images that can be captured. For this reason, the system control unit 50 is not started. Although a display is not performed on the display unit 28, the light emission of the LED 208 enables the user to recognize that the interval image capturing period is currently set. Assuming that image capturing can be performed four times a day and interval image capturing can be continuously performed without replacing batteries for half a year, if information indicating that interval image capturing is being carried out is displayed on display unit 28, the period during which image capturing can be performed is shortened. This is because a greater amount of power is required for starting the system control unit 50 and performing a display on the display unit 28. Accordingly, the number of images that can be captured is reduced by an amount corresponding to the number of times of start-up of the system control unit 50. For example, if the system control unit 50 is started by the user once a day in the standby state other than the interval image capturing period, image capturing can be continuously performed only for about less than five months. Even when the image capture button 201 is pressed in the interval image capturing standby state, interval image capturing is not stopped (not stopped until the system control unit 50 is started). As illustrated in FIG. 5C, the LED 208 is not caused to emit light until the image capture button 201 is pressed in step S404. When the image capture button 201 is pressed as illustrated in FIG. 5D, the LED 208 emits light.

In step S406, the sub-CPU 70 determines whether pressing of the image capture button 201 is released. If it is determined that pressing of the image capture button 201 is released (YES in step S406), the processing proceeds to step S407. If it is determined that pressing of the image capture button 201 is not released (NO in step S406), the processing returns to step S405. Specifically, the LED 208 is caused to emit light when the image capture button 201 is pressed, and the LED 208 does not emit light when the image capture button 201 is not pressed. If the LED 208 emits light for a period, such as 30 seconds or two minutes, after the image capture button 201 is pressed, the power consumption increases. Accordingly, the LED 208 emits light only during the period in which the image capture button 201 is pressed and it is certain that the user is located near the digital camera 100.

In step S407, the sub-CPU 70 stops the light emission of the LED 208.

In step S408, the sub-CPU 70 determines whether the power supply button is pressed. The power supply button corresponds to the side button 203. If it is determined that the side button 203 (power supply button) is pressed (YES in step S408), the processing proceeds to step S409. If it is determined that the side button 203 is not pressed (NO in step S408), the processing proceeds to step S410.

In step S409, the sub-CPU 70 starts the system control unit 50. In step S409, the normal start-up is performed, instead of performing start-up for interval image capturing, and the system control unit 50 and the sub-CPU 70 are started in the same manner as the start-up from the sleep state (OFF state of the power supply).

In step S410, the sub-CPU 70 determines whether the period set in step S401 has elapsed. If it is determined that the set period has elapsed (YES in step S410), the processing proceeds to step S411. If it is determined that the set period has not elapsed (NO in step S410), the processing proceeds to step S404.

In step S411, the sub-CPU 70 starts the system control unit 50, like in step S409.

In step S412, the sub-CPU 70 instructs the system control unit 50 to perform processing in the interval image capturing mode. Specifically, the sub-CPU 70 starts the system control unit 50 in the interval image capturing mode according to a lapse of the set time, when the timer is set to the system control unit 50 in step S401 and information indicating the interval image capturing mode is set is recorded in step S402. With this configuration, the system control unit 50 is started by the sub-CPU 70, which has less power consumption, immediately before image capturing, even when the system control unit 50 is not started in the interval image capturing standby state. As a result, it is possible to continue the interval image capturing operation. As described above with reference to the flowchart of FIG. 3, when the system control unit 50 is started by the sub-CPU 70 in the interval image capturing mode, in the case of time setting as illustrated in FIG. 5E, the display unit 28 displays the next image capturing time for a predetermined period.

In step S413, the sub-CPU 70 stops the measurement of the time of the timer, and deletes the image capturing mode information stored in step S402.

The processing prior to step S414 illustrates processing in the interval image capturing standby state, while the processing subsequent to step S414 is not processing in the interval image capturing standby state, but is processing executed when the system control unit 50 is also started.

In step S414, the sub-CPU 70 determines whether the side button 203 is operated to instruct turning-off of the power supply. If it is determined that turning-off of the power supply is instructed (YES in step S414), the processing proceeds to step S415. If it is determined that turning-off of the power supply is not instructed (NO in step S414), the processing returns to step S401.

In step S415, the sub-CPU 70 instructs the system control unit 50 to turn off the power supply.

Figure 4:
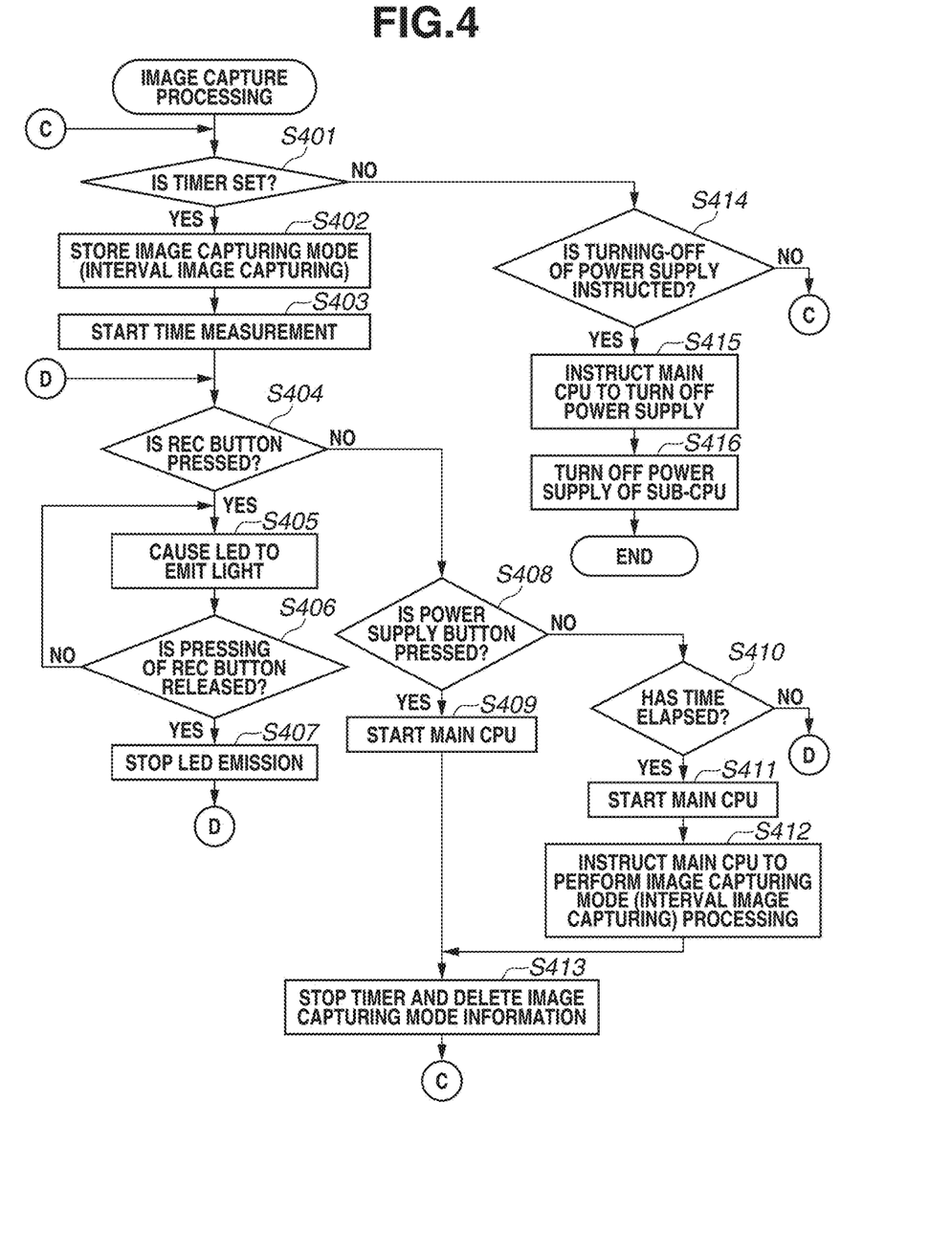
FIG. 4 is a flowchart illustrating image capture processing executed by a sub central processing unit (CPU) according to the first exemplary embodiment.
Figure 5C:
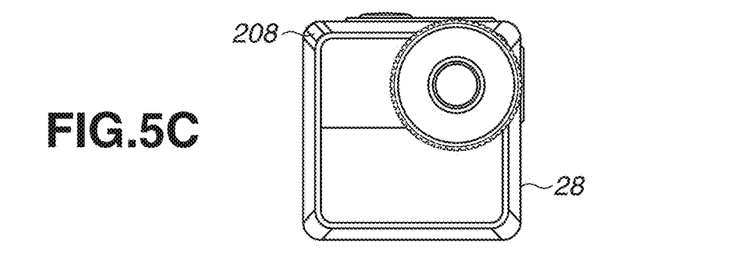
Figure 5D:
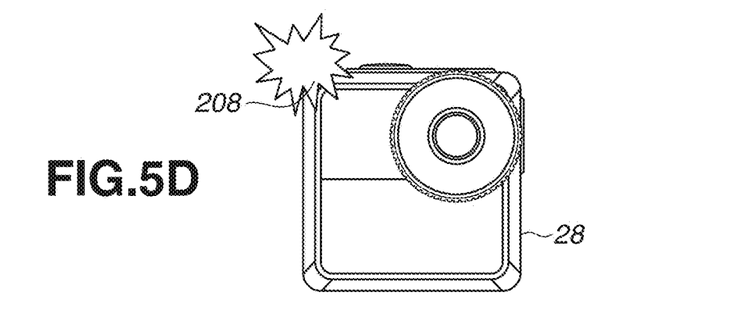
Figure 5E:
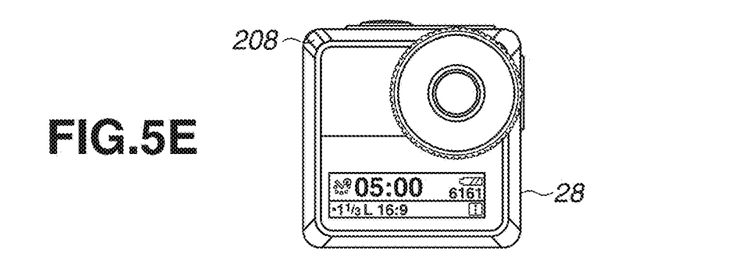

In step S416, the sub-CPU 70 turns off the power supply of the sub-CPU 70 and terminates the processing illustrated in FIG. 4. By the processing of steps S415 and S416, the power supply of the digital camera 100 is completely turned off and the operation of the system control unit 50 is interrupted until the side button 203 is pressed and the sub-CPU 70 detects pressing of a button. The LED 208 does not emit light even when the image capture button 201 is pressed in the state where the power supply of the system control unit 50 is turned off.

According to the exemplary embodiment described above, it is possible to enable the user to recognize that the interval image capturing period is currently set, while reducing the power consumption in interval image capturing. Further, when information indicating that interval image capturing is being carried out is displayed on the display unit 28, time is required for processing for starting the system control unit 50 by the sub-CPU 70, start-up processing by the system control unit 50, initialization processing, acquisition of display information, and display processing. On the other hand, when the LED 208 emits light, it is only necessary to cause the LED 208 to emit light in response to pressing of the image capture button 201, so that a notification can be provided to the user rapidly. For example, in the case of checking the remaining battery level of each of the digital cameras 100 that are set side by side in a wide field or the like, if the system control units 50 are started one by one and wait for a display, it takes a lot of time for checking. However, prompt light emission of the LED 208 enables rapid checking even in the case of checking a plurality of digital cameras. Similarly, also in a case where interval image capturing is cancelled, pressing of the side button 203 enables rapid termination processing also when a plurality of digital cameras 100 is provided.

In the case of the still image capturing mode and the moving image capturing mode, image capturing is performed when the image capture button 201 is pressed (image capturing is stopped during moving image capturing), and thus the LED 208 does not emit light. When the system control unit 50 is in a started state for image capturing in the interval image capturing mode, there is no particular processing executed when the image capture button 201 is pressed, and thus the LED 208 does not emit light. However, also in the case of storing an image file into the recording medium 200, the LED 208 is caused to blink to indicate that the recording medium 200 is accessed.

Figure 6A:
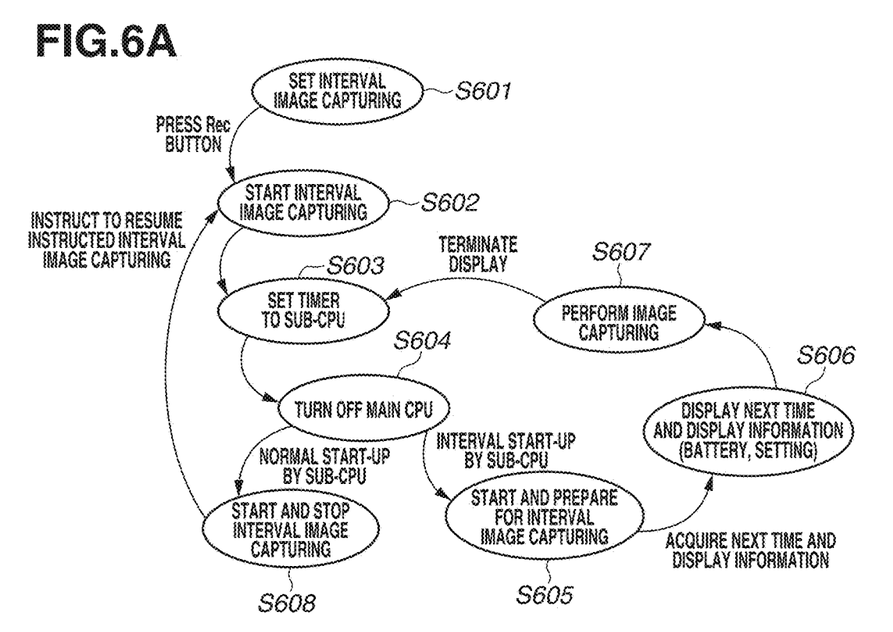
FIGS. 6A and 6B are state transition diagrams according to the first exemplary embodiment.
Figure 6B:
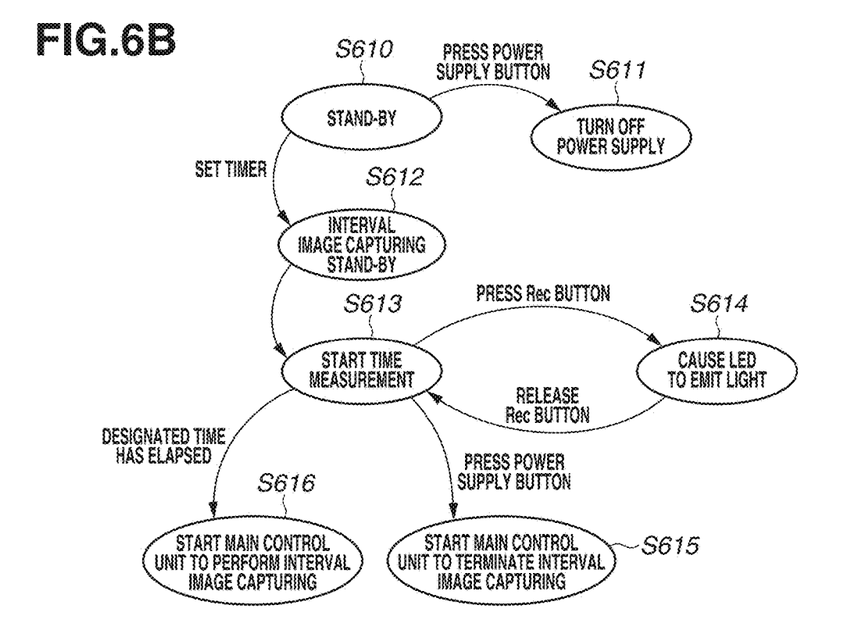

Next, the exemplary embodiment described above will be described with reference to FIGS. 6A and 6B. FIG. 6A illustrates interval image capturing processing executed by the system control unit 50, and FIG. 6B illustrates interval image capturing processing executed by the sub-CPU 70.

FIG. 6A will now be described. In a state where interval image capturing in step S601 is set, when the image capture button 201 is pressed, interval image capturing is started as illustrated in step S602. Further, in interval image capturing, as illustrated in step S603, the timer is set to the sub-CPU 70, and in step S604, the system control unit 50 is put into the sleep state.

In the sleep state, when the system control unit is started to perform interval image capturing, as illustrated in step S605, the system control unit 50 is started to be ready for interval image capturing, and displays the next image capturing time and information about image capturing as illustrated in step S606. After image capturing in step S607 is terminated, the display is also terminated and the system control unit 50 is put into the sleep step in step S603.

On the other hand, in the sleep state, when the system control unit 50 is normally started, internal image capturing is stopped after start-up, and the next interval image capturing operation is not carried out unless interval image capturing is instructed again.

FIG. 6B will now be described. In step S610, when the sub-CPU 70 is in the standby state and the power supply button is pressed, and in step S611, the power supply of the digital camera 100 is turned off. On the other hand, when the timer is set by the system control unit 50, the sub-CPU 70 shifts to processing to be in the standby state as illustrated in step S612. In step S613, the sub-CPU 70 starts the measurement of the time set by the system control unit 50.

After the time measurement is started, the LED 208 is caused to emit light as illustrated in step S614 only during a period in which the image capture button 201 is pressed, and when pressing of the image capture button 201 is released, the light emission of the LED 208 is also stopped.

On the other hand, when the power supply button (side button 203) is pressed after the measurement is started, in step S615, the system control unit 50 is normally started and terminates interval image capturing.

Further, after the time measurement is started, when the time set by the user elapses, in step S616, the system control unit 50 is started and interval image capturing is continued.

As described above, in both the system control unit 50 and the sub-CPU 70, a notification about interval image capturing can be provided to the user during image capturing in the interval image capturing mode, or in the standby state, while reducing the power consumption.

A second exemplary embodiment will be described with reference to FIG. 7. In the second exemplary embodiment, the configuration of the digital camera 100 illustrated in FIGS. 1A to 2C is the same as that according to the first exemplary embodiment.

Figure 7:
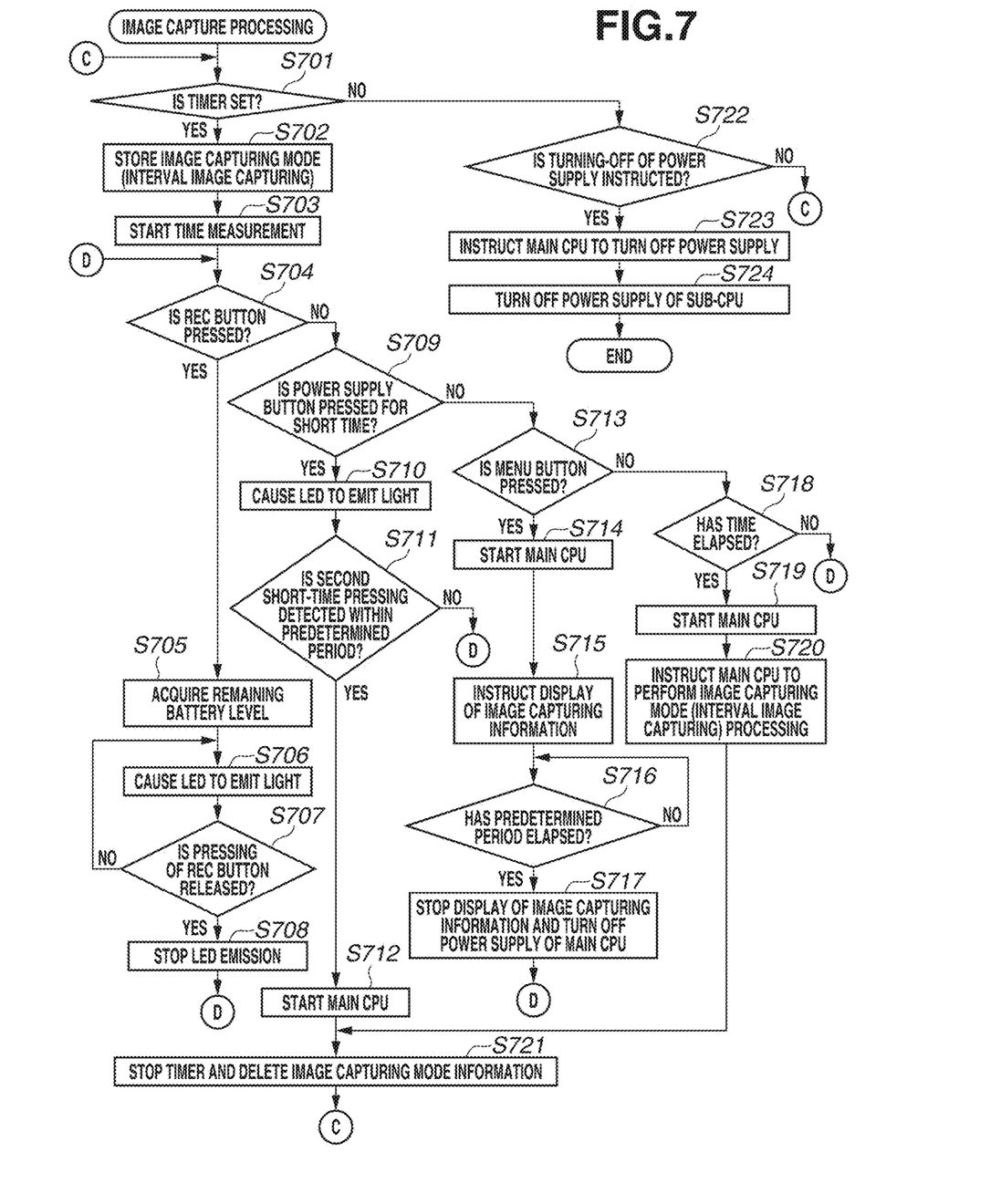
FIG. 7 is a flowchart illustrating image capture processing according to a second exemplary embodiment.

Image capture processing illustrated in FIG. 7 is image capture processing executed by the system control unit 50, and a part of the processing is the same as the processing illustrated in FIG. 4. The description of the same processing will be partially omitted.

Image capture processing executed by the sub-CPU 70 according to the present exemplary embodiment will be described with reference to FIG. 7. This processing is implemented in such a manner that a program recorded on the non-volatile memory 71 is loaded into the system memory 72 and the program is executed by the sub-CPU 70. This processing is started when power supply to the sub-CPU 70 from the power supply unit 30 through the power supply control unit 80 is started and the sub-CPU 70 is ready to perform control processing. The first exemplary embodiment illustrates an example where interval image capturing is stopped when the power supply button is pressed in the interval image capturing standby state, while the second exemplary embodiment illustrates an example where interval image capturing is not stopped in one operation.

Processing of steps S701 to S704 is similar to the processing of steps S401 to S404 illustrated in FIG. 4.

In step S705, the sub-CPU 70 acquire information about the remaining battery level from the power supply control unit 80.

In step S706, the sub-CPU 70 causes the LED 208 to emit light according to the remaining battery level based on the information about the remaining battery level acquired in step S705. For example, when the remaining battery level is equal to or more than half of the battery capacity, the LED 208 may be lit up (normal light emission). When the remaining battery level is in a range from ½ to ¹⁄₁₀ of the battery capacity, the LED 208 may be caused to blink. When the remaining battery level is less than ¹⁄₁₀ of the battery capacity, the LED 208 may be caused to blink at a high speed. Alternatively, the brightness of lighting may be increased as the remaining battery level decreases.

Processing of steps S707 to S708 is similar to the processing of steps S406 and S407 illustrated in FIG. 4.

In step S709, the sub-CPU 70 determines whether the side button 203 (power supply button) is pressed for a short time, such as less than 0.5 seconds. If it is determined that the side button 203 is pressed for a short time (YES in step S709), the processing proceeds to step S710. If it is determined that the side button 203 is not pressed for a short time (NO in step S709), the processing proceeds to step S713.

In step S710, the sub-CPU 70 causes the LED 208 to emit light. In step S710, the LED 208 does not emit light during the entire period in which the button is pressed by the user, and the light emission of the LED 208 is stopped after the LED 208 is caused to emit light for a predetermined period (e.g., 0.5 seconds).

In step S711, the sub-CPU 70 determines whether the side button 203 is pressed again within a predetermined period (e.g., two seconds) from the time when it is determined in step S709 that the side button 203 is pressed for a short time. After the side button 203 is first pressed and the LED 208 is caused to emit light, when the user presses the side button 203 again soon, it is highly likely that the user wishes to cancel interval image capturing, instead of intending to check whether interval image capturing is being carried out. Accordingly, if the side button 203 is pressed again within the predetermined period from the time when it is determined in step S709 that the side button 203 is pressed (YES in step S711), the processing proceeds to step S712. If the side button 203 is not pressed again within the predetermined period (NO in step S711), the processing proceeds to step S704.

In step S712, the sub-CPU 70 normally starts the system control unit 50, like in step S409 illustrated in FIG. 4.

In step S713, the sub-CPU 70 determines whether the top button 202 (menu button) is pressed. If it is determined that the top button 202 is pressed (YES in step S713), the processing proceeds to step S714. If it is determined that the top button 202 is not pressed (NO in step S713), the processing proceeds to step S718.

In step S714, the sub-CPU 70 starts the system control unit 50. However, start-up in step S714 is a start-up for display, and therefore the interval image capturing is not stopped thereby.

In step S715, the sub-CPU 70 instructs the system control unit 50 to display image capturing information. Specifically, the system control unit 50 is instructed to cause the display unit 28 to display the next time or image capturing interval, and information about the remaining battery level or the like.

In step S716, the sub-CPU 70 determines whether a predetermined period, such as six seconds or seven seconds, has elapsed after the display is instructed in step S715. If it is determined that the predetermined period has elapsed (YES in step S716), the processing proceeds to step S717. If it is determined that the predetermined period has not elapsed (NO in step S716), the system control unit 50 stands by until the predetermined time has elapsed.

In step S717, the sub-CPU 70 instructs the system control unit 50 to stop the display and turns off the power supply of the system control unit 50 to put the system control unit 50 into the sleep state. Thus, when the top button 202 is pressed, information about interval image capturing is displayed for the predetermined period, and then the system control unit 50 is put into the sleep state and the processing returns to step S704.

Processing of steps S718 to S720 is similar to the processing of steps S410 to S412 illustrated in FIG. 4.

In step S721, the sub-CPU 70 stops the timer to stop supply of image capturing mode information, like in step S413 illustrated in FIG. 4. In other words, the standby state of the interval image capturing mode is stopped.

Processing of steps S722 to S724 is similar to the processing of steps S414 to S416 illustrated in FIG. 4.

According to the exemplary embodiment described above, it is possible to enable the user to recognize that the interval image capturing period is currently set, while reducing the power consumption in interval image capturing. Even if the user unintentionally presses the side button 203, interval image capturing is not cancelled unless the side button 203 is pressed again within the predetermined period. With this configuration, the possibility that interval image capturing may be unintentionally stopped can be reduced. Further, rapid pressing of the side button 203 twice enables the operation for stopping interval image capturing to be rapidly terminated even when a plurality of digital cameras 100 is provided. When the top button 202 is pressed, after the information about interval image capturing is displayed and when the predetermined period elapses, the display is stopped and the system control unit is put into the sleep state. Thus, the user can recognize the information about interval image capturing without stopping interval image capturing, while reducing the power consumption.

In the light emission of the LED 208 in step S706, the method for light emission may be changed not according to the remaining battery level, but according to the length of time until the next image capturing. For example, when the next image capturing operation is performed within three minutes, the LED 208 may be caused to blink at a high speed. When the next image capturing operation is performed within 15 minutes, the LED 208 may be caused to blink. When the next image capturing operation is to be performed after more than 15 minutes, the LED 208 may be lit up.

In the foregoing, various control operations were described as being carried out by the system control unit 50 and the sub-CPU 70. However, various control operations may be carried out by one piece of hardware, or the control processing of the entire apparatus may be shared by a plurality of pieces of hardware.

The present invention has been described in detail above based on the exemplary embodiments. However, the present invention is not limited to these specific exemplary embodiments and can be carried out in various modes without departing from the scope of the invention. Furthermore, the exemplary embodiments described above are merely example embodiments of the present invention, and the exemplary embodiments can be combined as appropriate.

The exemplary embodiments described above illustrate an example where the present invention is applied to the imaging control apparatus, but the present invention is not limited to this example. The present invention can be applied to any imaging control apparatus, as long as the imaging control apparatus can display the time information such as the image capturing time or interval, or the imaging control apparatus can control the notification using light emission of an LED or output of sound. Specifically, the present invention can also be applied to a personal computer (PC), a mobile phone, and a portable image viewer which can control the imaging control apparatus capable of controlling the display of the time information such as the image capturing time or interval for interval image capturing, or the notification using light emission of an LED or output of sound. In addition, the present invention can also be applied to a digital photo frame, a music player, a game console, an electronic book reader, a tablet PC, a smartphone, home electrical appliances, and the like. The present invention can also be applied to apparatuses such as a smartphone, a tablet PC, and a desktop PC, which are capable of communicating with a device that performs interval image capturing, such as a digital camera, through a wire or wirelessly, and capable of remotely sending an instruction to the digital camera (including a network camera). There is no need for the system control unit 50 and the sub-CPU to be incorporated in the same apparatus. Alternatively, the system control unit 50 and the sub-CPU may be incorporated in separate apparatuses, respectively, which are capable of sending a start-up instruction, a sleep instruction, a display instruction, and the like.

The present invention can also be implemented by the following processing. That is, software (program) for implementing the functions according to the exemplary embodiments described above is supplied to a system or apparatus via a network or various recording media, and a computer (or a CPU, a micro processing unit (MPU), etc.) of the system or apparatus reads out program code and executes the program code. In this case, the program and recording media storing the program constitute the present invention.

According to the present invention, it is possible to enable the user to timely recognize that a series of image capturing operations for performing a plurality of image capturing operations is being carried out, while reducing the power consumption in the series of image capturing operations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-081640, filed Apr. 17, 2017, which is hereby incorporated by reference herein in its entirety.

What is claimed is:

1. An imaging control apparatus comprising: a first operation unit; and
a sub-control unit configured to perform control in such a manner that, in a case of performing a series of image capturing operations for performing a plurality of image capturing operations including a first image capturing operation and a second image capturing operation to be performed after the first image capturing operation, in a third period between a first period for performing the first image capturing operation and a second period for performing the second image capturing operation, a display is not performed on a display unit and a notification is not provided to a user by a notification unit different from the display unit, and in response to an operation performed by the first operation unit in the third period, the notification is performed by the notification unit different from the display unit without performing the display on the display unit.

2. The imaging control apparatus according to claim 1, wherein the first operation unit is used to start the series of image capturing operations.

3. The imaging control apparatus according to claim 1, wherein the notification unit performs the notification by light emission or sound.

4. The imaging control apparatus according to claim 1, comprising a main control unit configured to stop an operation upon switching to the third period, and to turn on the display unit during the operation.

5. The imaging control apparatus according to claim 4, wherein activation of the main control unit is stopped after the series of image capturing operations, and
wherein the sub-control unit controls to activate the main control unit after a lapse of a predetermined period after the series of image capturing operations.

6. The imaging control apparatus according to claim 1, wherein in the third period, the display is performed on the display unit according to an operation performed by a second operation unit different from the first operation unit.

7. The imaging control apparatus according to claim 6, wherein the second operation unit includes a unit configured to switch ON and OFF of a power supply of the imaging control apparatus.

8. The imaging control apparatus according to claim 6, wherein in the third period, the series of image capturing operations is stopped according to an operation performed on the second operation unit.

9. The imaging control apparatus according to claim 1, further comprising an acquisition unit configured to acquire information about a power supply of the imaging control apparatus,
wherein a method for performing the notification by the notification unit is changed depending on the information about the power supply acquired by the acquisition unit.

10. The imaging control apparatus according to claim 4, wherein an amount of power consumed in control processing performed by the main control unit is larger than an amount of power consumed in control processing performed by the sub-control unit.

11. A control method for an imaging control apparatus including a first operation unit, the control method comprising:
performing a sub-control in such a manner that, in a case of performing a series of image capturing operations for performing a plurality of image capturing operations including a first image capturing operation and a second image capturing operation to be performed after the first image capturing operation, in a third period between a first period for performing the first image capturing operation and a second period for performing the second image capturing operation, a display is not performed on a display unit and a notification is not provided to a user by a notification unit different from the display unit, and in response to an operation performed by the first operation unit in the third period, the notification is performed by the notification unit different from the display unit without performing the display on the display unit.

12. A non-transitory computer readable storage medium storing a program for causing a computer to execute a control method for an imaging control apparatus including a first operation unit, the control method comprising:
performing a sub-control in such a manner that, in a case of performing a series of image capturing operations for performing a plurality of image capturing operations including a first image capturing operation and a second image capturing operation to be performed after the first image capturing operation, in a third period between a first period for performing the first image capturing operation and a second period for performing the second image capturing operation, a display is not performed on a display unit and a notification is not provided to a user by a notification unit different from the display unit, and in response to an operation performed by the first operation unit in the third period, the notification is performed by the notification unit different from the display unit without performing the display on the display unit.

* * * * *